US009074517B2

(12) United States Patent
Matsusaka et al.

(10) Patent No.: US 9,074,517 B2
(45) Date of Patent: Jul. 7, 2015

(54) VEHICLE COOLANT CONTROL VALVE

(75) Inventors: Masanobu Matsusaka, Handa (JP);
Tadayoshi Sato, Chita-gun (JP);
Kentaroh Mochizuki, Nagoya (JP);
Koji Nunami, Obu (JP)

(73) Assignee: AISIN SEIKI KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 13/637,919

(22) PCT Filed: Mar. 30, 2011

(86) PCT No.: PCT/JP2011/058671
§ 371 (c)(1),
(2), (4) Date: Sep. 27, 2012

(87) PCT Pub. No.: WO2011/132530
PCT Pub. Date: Oct. 27, 2011

(65) Prior Publication Data
US 2013/0020513 A1    Jan. 24, 2013

(30) Foreign Application Priority Data
Apr. 19, 2010   (JP) ................................. 2010-095994

(51) Int. Cl.
*F16K 31/06*     (2006.01)
*F01P 7/16*      (2006.01)

(52) U.S. Cl.
CPC ............. *F01P 7/165* (2013.01); *F16K 31/0651* (2013.01); *F16K 31/0658* (2013.01)

(58) Field of Classification Search
CPC ... F16K 31/0658; F16K 31/0651; F01P 7/165
USPC ........ 251/65, 82, 83, 129.01, 129.03, 129.15, 251/129.16, 129.21, 129.22, 157; 137/522, 137/529
See application file for complete search history.

(56) References Cited

U.S. PATENT DOCUMENTS 3,433,256 A * 3/1969 Tobler et al. ................... 137/529
4,275,759 A * 6/1981 Huang .......................... 137/528

(Continued)

FOREIGN PATENT DOCUMENTS

CN     1436941 A        8/2003
DE     103 43 940 A1    4/2005

(Continued)

OTHER PUBLICATIONS

International Search Report (PCT/ISA/210) issued on Nov. 8, 2011, by the Japanese Patent Office as the International Searching Authority for International Application No. PCT/JP2011/058671.

(Continued)

*Primary Examiner* — William McCalister
*Assistant Examiner* — Ian Paquette
(74) *Attorney, Agent, or Firm* — Buchanan Ingersoll & Rooney PC

(57) ABSTRACT

An object is to provide a vehicle coolant control valve having excellent response, small size and weight, and low power consumption. A coolant stop valve (vehicle coolant control valve) valve comprises a valve body for controlling the flow of a fluid, the valve body having a magnetic body; a coil spring (urging device) for moving the valve body in the closing direction; a valve seat capable of coming in contact with the valve body; and a solenoid for moving the valve body in the closing direction; wherein the valve body is moved in the opening direction by fluid pressure of a fluid discharged from a water pump (pump) during operation of the water pump (pump), against the movement force of the coil spring (urging device) in the closing direction.

15 Claims, 8 Drawing Sheets

(56) References Cited

U.S. PATENT DOCUMENTS

| | | | |
|---|---|---|---|
| 5,487,407 A * | 1/1996 | Eaker | 137/522 |
| 5,915,669 A | 6/1999 | Zabeck et al. | |
| 6,612,338 B2 * | 9/2003 | Weldon et al. | 137/630.19 |
| 6,820,817 B2 | 11/2004 | Leu | |
| 6,918,357 B2 * | 7/2005 | Norris | 123/41.1 |
| 6,935,364 B1 * | 8/2005 | Tarazona et al. | 137/529 |
| 6,966,278 B2 | 11/2005 | Takahashi | |
| 7,506,663 B2 * | 3/2009 | Thomas et al. | 137/529 |
| 2003/0070714 A1 | 4/2003 | Babin | |
| 2007/0069165 A1 | 3/2007 | Hess et al. | |
| 2009/0183698 A1 | 7/2009 | Burssner et al. | |
| 2009/0205593 A1 * | 8/2009 | Huang | 123/90.11 |
| 2013/0161547 A1 | 6/2013 | Matsusaka et al. | |
| 2013/0161548 A1 | 6/2013 | Matsusaka et al. | |
| 2013/0220243 A1 | 8/2013 | Matsusaka et al. | |
| 2013/0240174 A1 | 9/2013 | Matsusaka et al. | |

FOREIGN PATENT DOCUMENTS

| | | |
|---|---|---|
| DE | 10 2009 004803 A1 | 7/2009 |
| EP | 0 816 732 A2 | 1/1998 |
| JP | 2002-340219 A | 11/2002 |
| JP | 2003-328753 A | 11/2003 |

OTHER PUBLICATIONS

Written Opinion (PCT/ISA/237) issued on Nov. 8, 2011, by the Japanese Patent Office as the International Searching Authority for International Application No. PCT/JP2011/058671.

International Preliminary Report on Patentability (PCT/IB/338) and Written Opinion of the International Searching Authority (PCT/ISA/237) in the corresponding International Patent Application No. PCT/JP2011/058671.

Chinese Notification of the First Office Action dated Mar. 3, 2014 issued in the corresponding Chinese Patent Application No. 201180014348.0 and Chinese Search Report dated Feb. 14, 2014.

* cited by examiner

VEHICLE COOLANT CONTROL VALVE

TECHNICAL FIELD

The present invention relates to a vehicle coolant control valve used in the cooling system of an engine or the like.

BACKGROUND ART

In order to stabilize combustion and enhance fuel economy of an engine, a system is generally used for controlling the coolant temperature so as to be constant by bypassing a coolant passage from a radiator by opening and closing a thermostat valve.

Thermostat valves are known in which a channel to a radiator outlet passage is provided to an independent thermo element temperature-sensitive chamber on the engine outlet side, and the thermostat valve is actuated in a manner with the radiator outlet-side coolant temperature reflected too. A thermo wax which thermally expands is sealed in the then no element of the thermostat valve, and the valve body is opened and closed according to the coolant temperature. Furthermore, a Nichrome heater or other heating element coupled with the thermo element, and the valve body is opened and closed to electronically control the coolant temperature (see Patent Literature 1, for example).

Solenoid valves are also known which have a movable part that is urged in the closing direction by a spring. The valve is closed when a coil is not excited, and open when the coil is excited (see Patent Literature 2, for example).

PRIOR ART LITERATURE

Patent Literature

[Patent Literature 1] Japanese Unexamined Patent Application Publication No. 2003-328753
[Patent Literature 2] Japanese Unexamined Patent Application Publication No. 2002-340219

SUMMARY OF INVENTION

Technical Problem

However, in the technique of Patent Literature 1, the heat of the coolant heated by the engine is radiated from the temperature-sensitive chamber to the low-temperature side, thereby delaying operation of the thermo element, and the valve takes time to open. The supply of heated coolant to the radiator is therefore delayed, which may lead to engine overheating.

In the technique of Patent Literature 2, in a case in which a solenoid valve is used to control the radiator coolant temperature, the valve requires a larger pressure-receiving surface area than for hydraulic control, and the necessary drive force is thereby increased. A large-capacity solenoid is therefore required, which creates the problem of increased size and mass of the solenoid. Application of electric power must also be continued in order to maintain the open state, and power consumption increases.

In view of the foregoing problems, an object of the present invention is to provide a vehicle coolant control valve having excellent response, small size and weight, and lower power consumption than the conventional technique.

Solution to Problem

According to an aspect of the present invention, the vehicle coolant control valve comprises a valve body for controlling the flow of a fluid, the valve body having a magnetic body;
a valve seat capable of coming in contact with the valve body;
urging means for urging the valve body toward the valve seat; and
a solenoid for moving the valve body toward the valve seat;
wherein the valve body is moved in the opening direction by fluid pressure of a fluid discharged from a pump during operation of the pump, against the urging force of the urging means in the closing direction.

In the vehicle coolant control valve according to the aspect described above, the valve body is closed by the urging means (which includes the elastic force of a coil spring, or gravity acting on the valve body) or the attractive force of the solenoid. Through this configuration, since the valve body can be immediately opened by removing the attractive force of the solenoid on the valve body, the response time is reduced, and control properties are enhanced relative to a case in which a thermally expanding thereto element is used. A circulating passage can therefore be freely opened even when the coolant temperature is low. Since the valve body is urged in the closing direction by the urging force, the attractive force of the solenoid acting in the closing direction can be set to a low value, and the size and weight of the solenoid can be reduced. When the fluid is circulated in the circulating passage provided between a heat exchanger and the engine, since the electric power supply to the solenoid is cut off and the valve body is also opened by fluid pressure, the power consumption of the solenoid can be reduced.

According to another aspect of the present invention, the valve seat is provided to a core for housing the solenoid.

Through this configuration, the magnetic body that constitutes the valve body and the core that constitutes the valve seat can be set a close distance apart, the attractive force per unit of current can be increased, and power consumption can be reduced.

According to another aspect of the present invention, the valve body is maintained in contact with the valve seat by the urging force acting in the closing direction when the pump is stopped; the valve body is maintained in contact with the valve seat by an attractive force acting in the closing direction and the urging force acting in the closing direction, when the pump is operated and the solenoid is excited; and the valve body is pushed and retained in an open state by a fluid pressure acting in the opening direction when the pump is operated and the solenoid is not excited.

Through this configuration, the valve body is maintained in contact with the valve seat by the urging force acting in the closing direction when the pump is stopped, and the valve body is integrated with the valve seat in a state in which there is no fluid pressure. Therefore, a condition in which the valve body is seated on the valve seat can be maintained while the engine is stopped. Since the valve body is maintained in contact with the valve seat by an attractive force acting in the closing direction, and the urging force acting in the closing direction in the situation with the pump not operated yet and the solenoid is excited at the start of the engine, the magnetomotive force of the solenoid can be set to a low value, and the size and weight of the solenoid can be reduced. Furthermore, since the valve body is pushed and retained in an open state by a fluid pressure acting in the opening direction when the pump is operated and the solenoid is not excited, the valve body is maintained in the open state without consuming any power, and the overall power consumption of the device can be reduced.

According to another aspect of the present invention, the fluid flows through the outside of the valve body when the valve body is open.

Through this configuration, since the entire surface of the valve body acts as a path for magnetic flux, in contrast with a configuration in which a through-hole-shaped fluid channel is provided to a portion of the valve body, adequate attractive force can be exerted on the valve body from the solenoid even when the valve body is formed by a thin plate. Since a fluid channel is not provided to a portion of the valve body, the size and weight of the valve body can be reduced, the shape thereof can be simplified, and the overall size of the control valve can be reduced.

According to another aspect of the present invention, a housing is provided for surrounding at least the valve body and the urging means, and when the valve body is open, the fluid flows between the valve body and the housing.

Through this configuration, since a passage is formed between the inside surface of the housing and the external peripheral surface of the valve body, the number of components can be reduced, and the overall size of the control valve can be reduced relative to a configuration in which a passage formation member is provided separately from the housing.

According to another aspect of the present invention, a valve body guide part for guiding the valve body in the opening and closing direction is provided between an external peripheral surface of the valve body and an internal peripheral surface of the housing.

Through this configuration, since there is no need to provide a shaft-shaped guided member near the center of the valve body or elsewhere, the valve body can be formed by a simple plate-shaped member, and the mass of the valve body can be reduced. Since there is also no need for a special guide region in the housing, it is possible to adopt such configurations as forming a passage fluid outlet concentrically with the axis of the valve internal passage surrounded by the valve seat of the housing, for example.

According to another aspect of the present invention, the valve body is disc-shaped, and a plurality of the valve body guide parts is provided at equal intervals in the peripheral direction of the valve body.

Through this configuration, friction received from the valve body guide parts during opening and closing of the valve body acts uniformly in the peripheral direction of the valve body, and the flow of fluid through the outside of the valve body is also uniform in the peripheral direction of the valve body with respect to the valve body. The effect of forces that act so as to tilt the valve body from the expected orientation is thereby reduced, and the valve body is therefore easily maintained in the expected orientation perpendicular to the axis.

According to another aspect of the present invention, the valve body comprises a concave part having a bottom part further downstream in the flow direction of the fluid than the center of gravity of the valve body.

Through this configuration, the fluid pressure for opening the valve body is focused in the space enclosed by the concave part, and the fluid pressure thereby acts more significantly in the valve opening direction than at the center of gravity of the valve body itself. The valve body is therefore easily stabilized in the expected orientation perpendicular to the axis.

According to another aspect of the present invention, the concave part is provided at the center in the radial direction of the valve body.

Through this configuration, since the force of the fluid opening the valve body acts more in the opening direction than at the center of gravity of the valve body itself, and in the center in the radial direction, the orientation of the valve body is more easily stabilized.

According to another aspect of the present invention, a flow control wall is provided so as to face a lateral surface of the valve body until the valve body separates a predetermined amount from the valve seat.

Through this configuration, in a state in which a pressure of a certain value or less is applied to the valve body from the fluid by the action of the pump, a small amount of fluid enters the thin annular space between the valve body and the valve seat and flow control wall, the valve body is separated slightly from the valve seat by the pressure of the fluid entering the space, and the valve body is maintained at a position at which at least a portion of the lateral surface of the valve body faces the flow control wall in the radial direction. In this state, an essentially closed state is obtained in which the valve body does not come in contact with the valve seat. Consequently, noise due to contact between the valve body and the valve seat, or abrasion of these members is suppressed.

According to another aspect of the present invention, a fluid outlet is formed on an axis along the opening and closing direction of the valve body.

Through this configuration, since a passage which extends linearly overall is formed via the fluid outlet from the valve internal passage surrounded by the valve seat, a vehicle coolant control valve is obtained having minimal flow resistance to the fluid. Since the passage is linear in this configuration, the orientation of the valve is more easily maintained, and the flow resistance exerted on the fluid by the vehicle coolant control valve is lower than in a configuration in which a fluid outlet is provided beside the valve.

DESCRIPTION OF EMBODIMENTS

Embodiments of the present invention are described below.
(First Embodiment)

Figure 1:
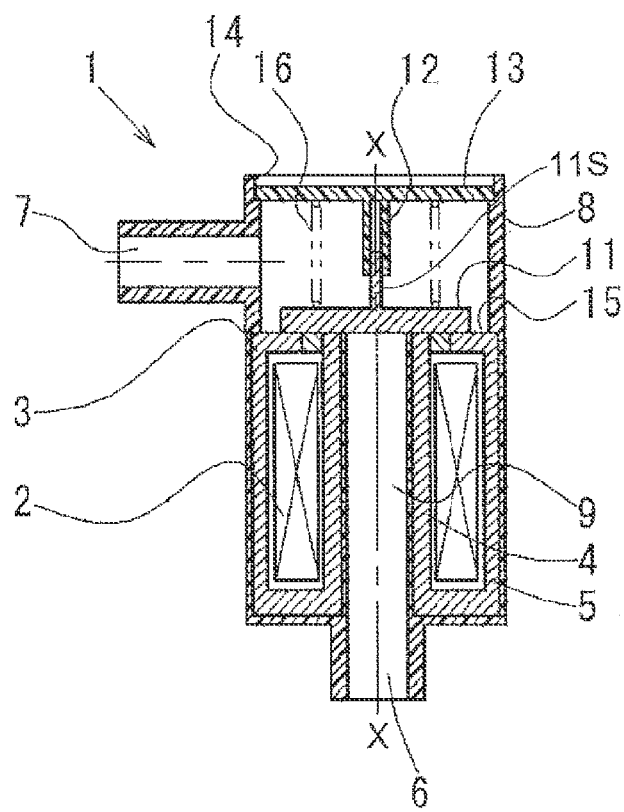
FIG. 1 is a sectional view showing the closing operation of the coolant stop valve according to a first embodiment.
Figure 2:
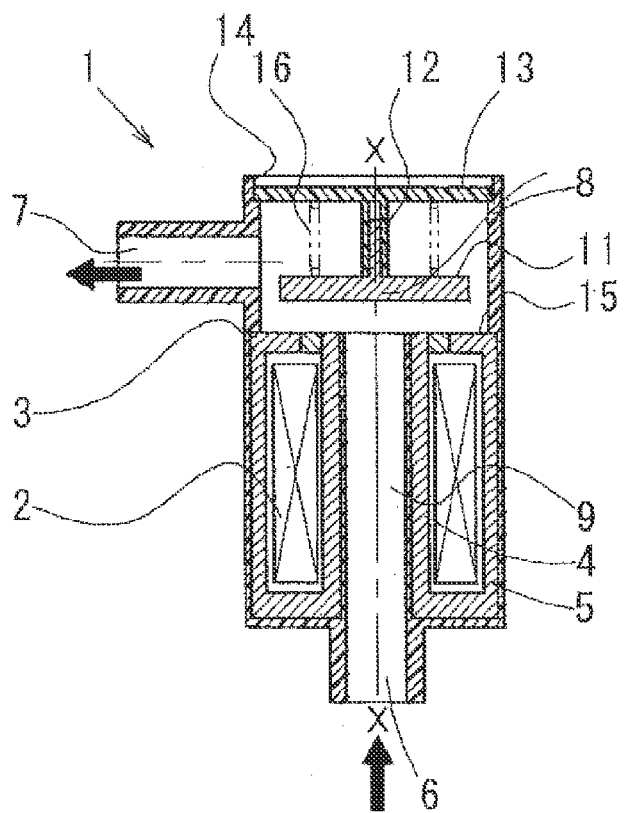
FIG. 2 is a sectional view showing the opening operation of the coolant stop valve according to the first embodiment.

FIG. 1 is a sectional view showing the closing operation of the coolant stop valve 1 (as an example of the vehicle coolant control valve), and FIG. 2 is a sectional view showing the opening operation of the coolant stop valve 1.

The coolant stop valve 1 is provided with a valve body 11 for controlling the circulation of fluid, the valve body 11 having a magnetic body; a valve seat 15 capable of making contact with the valve body 11; a coil spring 16 (as an example of the urging means) for urging the valve body 11 toward the valve seat 15; and a solenoid 2 for moving the valve body 11 toward the valve seat 15 (bringing the valve body into contact with the valve seat 15; maintaining the valve body in the valve seat). During actuation of a pump, the valve body 11 is moved in the opening direction against the urging force of the coil spring 16 in the closing direction by the fluid pressure of the water or other fluid discharged from the pump.

The solenoid 2 is composed of a coiled conductive wire which is wound on the outside of an inside-diameter part 4 of a core 3 formed of iron or another magnetic body, and the solenoid 2 is housed by the inside-diameter part 4 and an outside-diameter part 5. The solenoid 2 is electrically connected to an external drive circuit (not shown) by a connector (not shown).

The core 3 is installed in a housing 8 that is provided with an input port 6 and an output port 7. A valve internal passage 9 is formed on the inside of the inside-diameter part 4 of the core 3 and communicated with the input port 6.

The valve body 11 is molded of iron or another magnetic body, and is supported by a cylindrical bearing part 12 so as to be able to slide along the axis X of the coolant stop valve 1, the bearing part 12 extending from the inside surface of a cover 13. More specifically, the valve body 11 is supported by a rod-shaped center shaft 11S which extends in the opposite direction of the valve seat from the valve body 11, and the bearing part 12 which is fitted on the outside of the center shaft 11S so as to be able to slide along the opening and closing direction of the valve body 11.

The cover 13 is installed to hermetically seal a housing opening 14 formed on the opposite side from the input port 6. The valve seat 15 for coming in contact with the valve body 11 is formed on a flange surface of the core 3 on the opposite side from the input port 6. The coil spring 16 for urging the valve body 11 in the direction of the valve seat 15 is installed between the valve body 11 and the cover 13.

As is apparent from FIG. 2, during opening of the valve body 11, fluid flows parallel to the axis X on the outside of the valve body 11 in the radial direction thereof (i.e., between the valve body 11 and an annular inside wall surface of the housing 8), and is discharged from the output port 7 formed on the side of the housing 8. The fluid flowing on the outside of the valve body 11 in the radial direction thereof at a position separated from the output port 7 in the radial direction reaches the output port 7 via the region between the valve body 11 and the cover 13.

Figure 3:
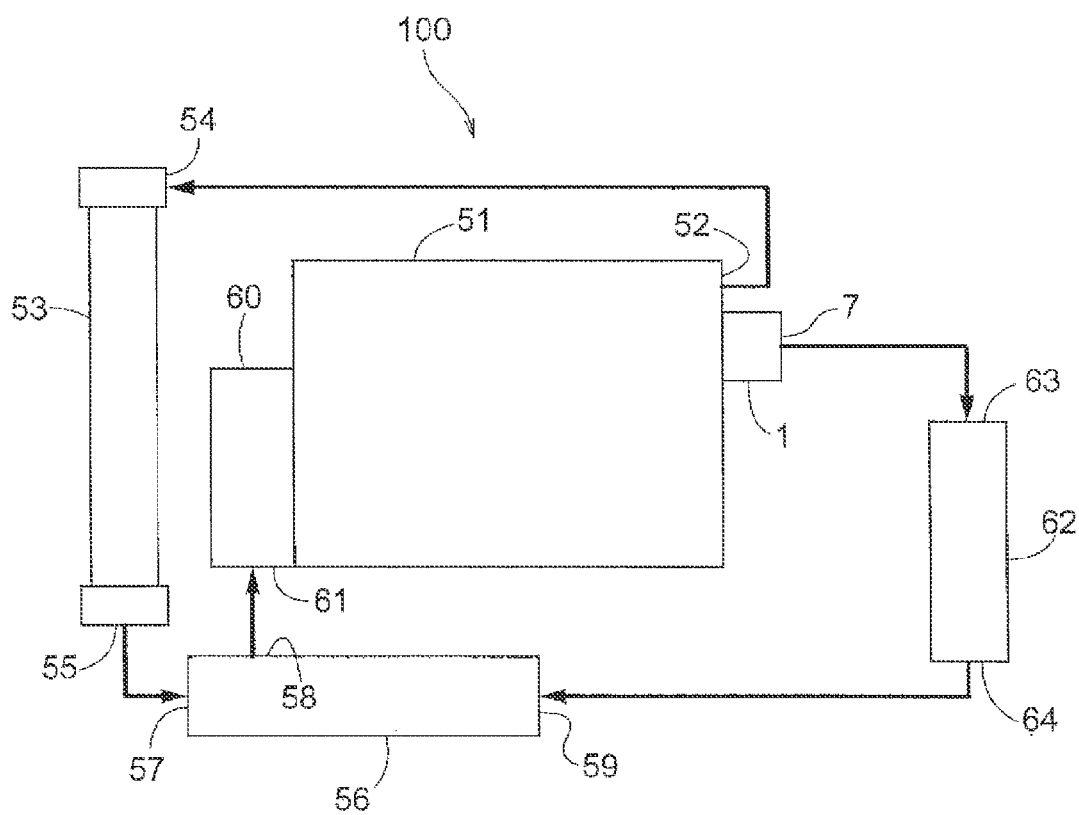
FIG. 3 is a view showing the overall configuration of the engine cooling system according to the embodiments.

FIG. 3 is a view showing the overall configuration of the engine cooling system 100. An input port 54 of a radiator 53 is connected to a coolant output port 52 of an engine 51, and an output port 55 of the radiator 53 is connected to an input port 57 of a thermostat valve 56. An output port 58 of the thermostat valve 56 is connected to an intake port 61 of a water pump 60 that is driven by the engine 51. A discharge port (not shown) of the water pump 60 is connected to a coolant input port (not shown) of the engine 51.

An output port for air warming (not shown) of the engine 51 is connected to the input port 6 (see FIG. 1) of the coolant stop valve 1. On the other hand, the output port 7 of the coolant stop valve 1 is connected to an input port 63 of a heater core 62, and an output port 64 of the heater core 62 is connected to a bypass input port 59 of the thermostat valve 56. The bypass input port 59 is communicated with the output port 58.

When the engine 51 is stopped (FIG. 1), the water pump 60 is stopped and power to the solenoid 2 is cut, but because the valve body 11 is urged to contact with the valve seat 15 by the urging force of the coil spring 16, the coolant stop valve 1 is maintained in the closed state.

At startup of the engine 51 (FIG. 1), driving of the water pump 60 is started, and the fluid pressure created by the discharge of the water pump 60 acts on the valve body 11 via the valve internal passage 9, but because the solenoid 2 is excited by application of electrical power, the magnetic valve body 11 is pushed against the valve seat 15 by the attraction of the solenoid 2 and the urging force of the coil spring 16, and the coolant stop valve 1 is maintained in the closed state.

During air warming is used (FIG. 2), the solenoid 2 is placed in the non-excited state by cutting the electrical power thereto, and the attachment force on the valve body 11 is withdrawn to allow the coolant heated by the engine 51 to flow to the heater core 62. At this time, the fluid pressure acting on the valve body 11 via the valve internal passage 9 pushes the valve body 11 up from the valve seat 15 against the urging force of the coil spring 16, and the coolant stop valve 1 is maintained in the open state.

The coolant is cooled by the radiator 53 after being heated inside the engine 51, and is circulated by the water pump 60 through the thermostat valve 56.

When the temperature is low, the thermostat valve is placed in the closed state, the coolant does not flow through the radiator 53, but is circulated from the water pump 60 to the internal passage of the engine 51, the coolant stop valve 1, the heater core 62, the thermostat valve 56 and then returns to the water pump 60.

During air warming operation, the coolant heated inside the engine 51 is fed to the heater core 62 through the coolant stop valve 1 maintained in the open state by fluid pressure, and warms the air inside the cabin. The coolant cooled by the heater core 62 is circulated by the water pump 60 through the thermostat valve 56.

When air warming is not used, the valve body 11 and the coolant stop valve 1 are maintained in the closed state by the excitation of the solenoid 2, and the feeding of coolant to the heater core 62 is stopped.

The coolant stop valve 1 according to the present invention can be freely controlled by current rather than being opened by thermal expansion of thermo wax or the like, and is opened by a solenoid 2 having excellent response. Air warming can therefore become effective sooner, and comfort in cold conditions is enhanced.

In the closed state of the coolant stop valve 1, the valve body 11 and the valve seat 15 are in contact, the attractive force per unit of current is increased by the smaller distance to the magnetic body, and the urging force of the coil spring 16 also contributes to maintaining the closed state. The power consumption of the solenoid 2 can thereby be reduced.

Furthermore, since the valve body 11 is always urged toward the valve seat 15 by the coil spring 16 even when electric power is not applied to the solenoid 2, it is possible to suppress vibration of the valve body 11 due to fluid pressure pulsation, and to suppress noise due to collision of the vibrating valve body 11 with the valve seat 15.

The vehicle coolant control valve is applied to a coolant stop valve 1 for opening and closing the passage to the heater core 62, but the vehicle coolant control valve may also be applied to the thermostat valve 56 for opening and closing the passage to the radiator 53. In a case in which the vehicle coolant control valve is applied to the thermostat valve 56, the flow rate is greater than that of the coolant stop valve 1 for opening and closing the passage to the heater core 62, and the pressure-receiving surface area of the valve body 11 therefore naturally increases. Consequently, the urging force of the coil spring 16 necessary to maintain the valve body 11 in the open state against fluid pressure must generally be set to a high value. The attractive force of the solenoid 2 must accordingly be set to a high value.

However, in the coolant control valve of the present invention, since the valve body 11 is always urged in the closing direction by the coil spring 16, and the magnetic valve body 11 and the valve seat 15 are maintained in a state of contact with each other, the magnetomotive force required for the solenoid 2 can be set to a relatively low value. As a result, even when the pressure-receiving surface area of the valve body 11 is increased as described above, since the valve body 11 can be maintained in the closed state by a solenoid 2 having a relatively weak magnetomotive force, the solenoid 2 can be reduced in size and weight, and the mounting properties thereof are also enhanced. Through this configuration, it is possible to reduce the capacity of the switching element which is accompanied by loss due to heat in the drive circuit of the solenoid 2, and a small-sized power-saving-type drive circuit can be used.

In the coolant stop valve 1 of the present invention, by making the fluid pressure of the coolant obtained by the water pump 60 lower than usual at the start of coolant feeding to the radiator 53 after low-temperature startup of the engine 51, the valve body 11 can be maintained at a small opening degree rather than being opened to the maximum degree. By determining the timing for full opening of the valve body 11 by estimating a time constant or other characteristic value of the system on the basis of the fluid temperature increase at a low flow rate, overshooting or hunting of the fluid temperature is suppressed, combustion in the engine 51 is stabilized, and fuel economy is enhanced.

Furthermore, in the coolant stop valve 1 of the present invention, a configuration is adopted in which the open state is maintained by fluid pressure when electrical power is not applied to the solenoid 2. The coolant passage to the radiator 53 is therefore maintained and overheating of the engine 51 can be prevented even in the case of a failure such as a wire disconnection to the solenoid 2.

In the coolant stop valve 1 of the present invention, in a case in which the passage is blocked by the closed condition of the valve, the main load necessary to drive the water pump 60 is merely the stirring loss of the impeller in the casing of the water pump 60, and is smaller than the duct resistance loss during feeding of coolant to the radiator 53 or the like. Consequently, since there is no need to use an on-demand mechanism such as an electric water pump or water pump drive power cutoff mechanism, which is prone to increase complexity, the mechanism surrounding the vehicle engine can be simplified and reduced in weight, the energy loss that accompanies driving of the water pump 60 can be reduced, and fuel economy can be enhanced.

In the vehicle coolant control valve 1 shown in FIGS. 1 and 2, the solenoid 2 is installed on the periphery of the valve internal passage 9, but the solenoid may also be installed in a position away from the coolant passage, for such purposes as facilitating mounting. The position of the solenoid 2 relative to the housing 8 is also fixed in the vehicle coolant control valve 1 shown in FIGS. 1 and 2, but the valve body 11 may also be capable of moving in relation to the housing 8.

The coil spring 16 is used as an urging means for urging the valve body 11 in the closing direction in the vehicle coolant control valve 1 shown in FIGS. 1 and 2, but an air spring, magnetism, gravitational force acting on the mass of the valve body 11, or other urging means may be used.

The water pump 60 is also not necessarily the only means for circulating the coolant, and an accumulator or the like may also be used in auxiliary fashion.

The vehicle coolant control valve 1 is used in the cooling system of the body of the engine 51 in the present invention, but may also be applied to a cooling system of a catalyst installed in the exhaust pipe, a liquid-cooling-type oil cooler, or the like. The vehicle coolant control valve may also be applied as a control valve for a cooling system or an exhaust heat recovery system of a heat source such as a electric motor, inverter, secondary cell, or fuel cell etc. used in an electric vehicle.

(Second Embodiment)

Figure 4:
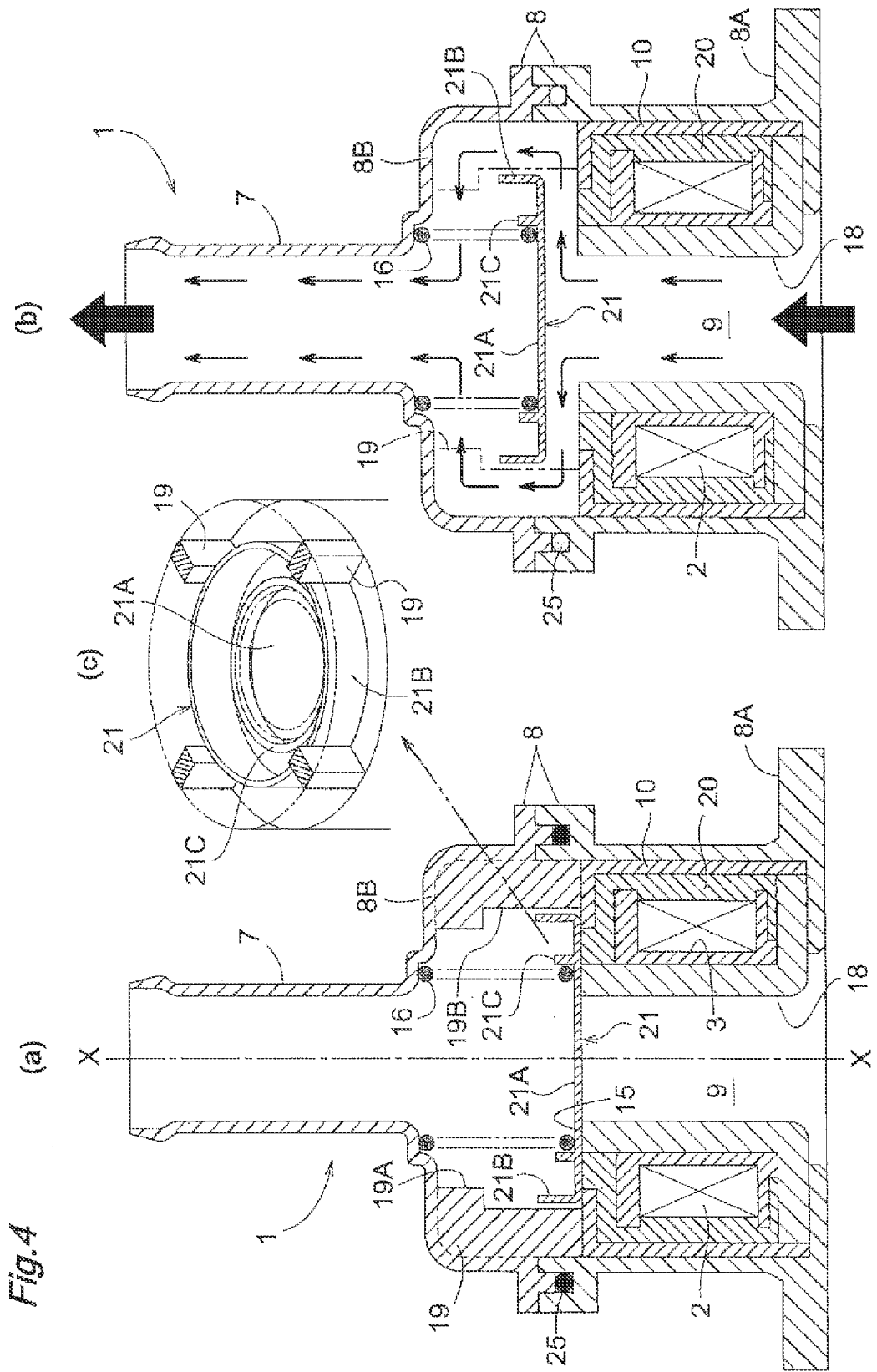
FIG. 4 is a sectional view showing the closing operation and opening operation of the coolant stop valve according to a second embodiment.

In a second embodiment of the vehicle coolant control valve 1, shown in FIG. 4, a valve body 21 has a disc-shaped valve body main body 21A, and an outer edge part 21B which extends from the external periphery of the valve body main body 21A parallel to the axis X on the opposite side from the valve seat 15. The valve body 21 is obtained by pressing an iron plate or the like having a smaller thickness than the valve body of the first embodiment.

The center shaft 11S shown in the first embodiment is omitted from the valve body 21. Instead of the center shaft 11S, a plurality of valve body guide parts 19 having the same shape is provided at equal intervals in the peripheral direction on the internal peripheral surface of the housing 8. The valve body guide parts 19 have guide parts 19A which extend parallel to the axis X, and valve receiving parts 19B which extend inward in the radial direction from the top end of the guide parts 19A. In other words, the outer edge part 21B on the external periphery of the valve body 21 is guided by the guide parts 19A of the valve body guide parts 19, and the valve body 21 is generally restricted to moving in the direction parallel to the axis X during opening and closing.

In this embodiment, four valve body guide parts 19 extending parallel to the axis X are provided on the internal peripheral surface of the housing 8. The valve body guide parts 19 are integrally formed during molding of the housing 8 from resin. The internal peripheral surface of the housing 8 on which the valve body guide parts 19 are provided is an example of the space between the external periphery of the valve body 21 and the internal peripheral surface of the housing 8.

The housing 8 is provided with a first housing 8A in which the solenoid 2 is packaged, and a second housing 8B to which the output port 7 is provided. These two housing members 8A, 8B are connected in a manner that an annular projection formed at one end of the second housing 8B is inserted into an annular groove formed at one end of the first housing 8A. During this insertion, an O-ring 25 placed in advance in the annular groove is pushed against the inner surface of the annular groove by the annular projection, thereby maintaining a liquid-tight seal in the housing 8.

Since the plurality of valve body guide parts 19 is arranged in integral fashion at equal intervals along the peripheral direction on the internal peripheral surface of the second housing 8B, merely by fitting the second housing 8B with the first housing 8A in a state in which the valve body 21 is set between the valve body guide parts 19 during assembly of the vehicle coolant control valve 1, the valve body 21 is assembled in the expected configuration of being able to freely move along the opening and closing direction between the valve body guide parts 19. Assembly is therefore facilitated.

The solenoid 2 is composed of a core 3 and a coiled conductive wire that is fitted on the outside of the inside-diameter part of the core 3. The external peripheral part of the solenoid 2 is encased by a resin internal casing 20, an annular yoke 10 is fixedly fitted onto the external periphery of the internal casing 20, and a generally annular passage formation member 18 (core) made of resin is fixedly fitted into the internal periphery of the internal casing 20. The solenoid 2, internal casing 20, yoke 10, and the passage formation member 18 constitute a single assembly having the axis X in common, and this assembly is fixedly fitted on the inside-diameter side of the resin first housing 8A.

The end surfaces of the passage formation member 18 and internal casing 20 each other cooperate to form the annular valve seat 15.

The output port 7 extends linearly along the axis X from the center of the generally cylindrical second housing 8B. As a result, the output port 7 and the valve internal passage 9 of the passage formation member 18 fitted on the inside of the solenoid 2 share the axis X.

The coil spring 16 installed between the valve body 21 and the inside wall surface of the second housing 8B constantly urges the valve body 21 toward the valve seat 15. Radial lengths of the input port or the output port 7, the coil spring 16, and the valve body 21 increase in this order.

When electrical power is applied to the solenoid 2, the valve body 21 is pushed against the valve seat 15 by the attractive force of the solenoid 2 and the urging force of the coil spring 16, as shown in FIG. 4A, and the vehicle coolant control valve 1 is maintained in the closed state regardless of the presence of fluid pressure from the valve internal passage 9.

On the other hand, when electrical power is not applied to the solenoid 2, the valve body 21 is pushed up from the valve seat 15 by fluid pressure against the urging force of the coil spring 16 when the fluid pressure from the valve internal passage 9 is adequately high, as shown in FIG. 4B.

When the valve body 21 is pushed up from the valve seat 15 by the fluid pressure, the fluid flows through the region on the outside of the valve body 21 in the radial direction thereof, i.e., between the valve body 21 and the annular inside wall surface of the second housing 8B, and is discharged from the output port 7.

Even when the valve body 21 is moved a long distance from the valve seat 15 by excessive fluid pressure, since the valve receiving parts 19B of the valve body guide parts 19 come in contact with the top end of the outer edge part 21B of the valve body 21, the passage is not closed by the valve body 21 being pressed against the ceiling of the second housing 8B.

In the open state of the valve body 21, the coolant water flowing along the axis X through the valve internal passage 9 passes through the external periphery of the valve body 21 uniformly in terms of the peripheral direction to collect in the vicinity of the axis X, and is discharged along the axis X from the output port 7. The flow of coolant water inside the vehicle coolant control valve 1 thus has consistent rotational symmetry about the axis X, and the valve body 21 separated from the valve seat 15 is therefore easily and stably maintained in the expected orientation perpendicular to the axis X.

(Third Embodiment)

Figure 5:
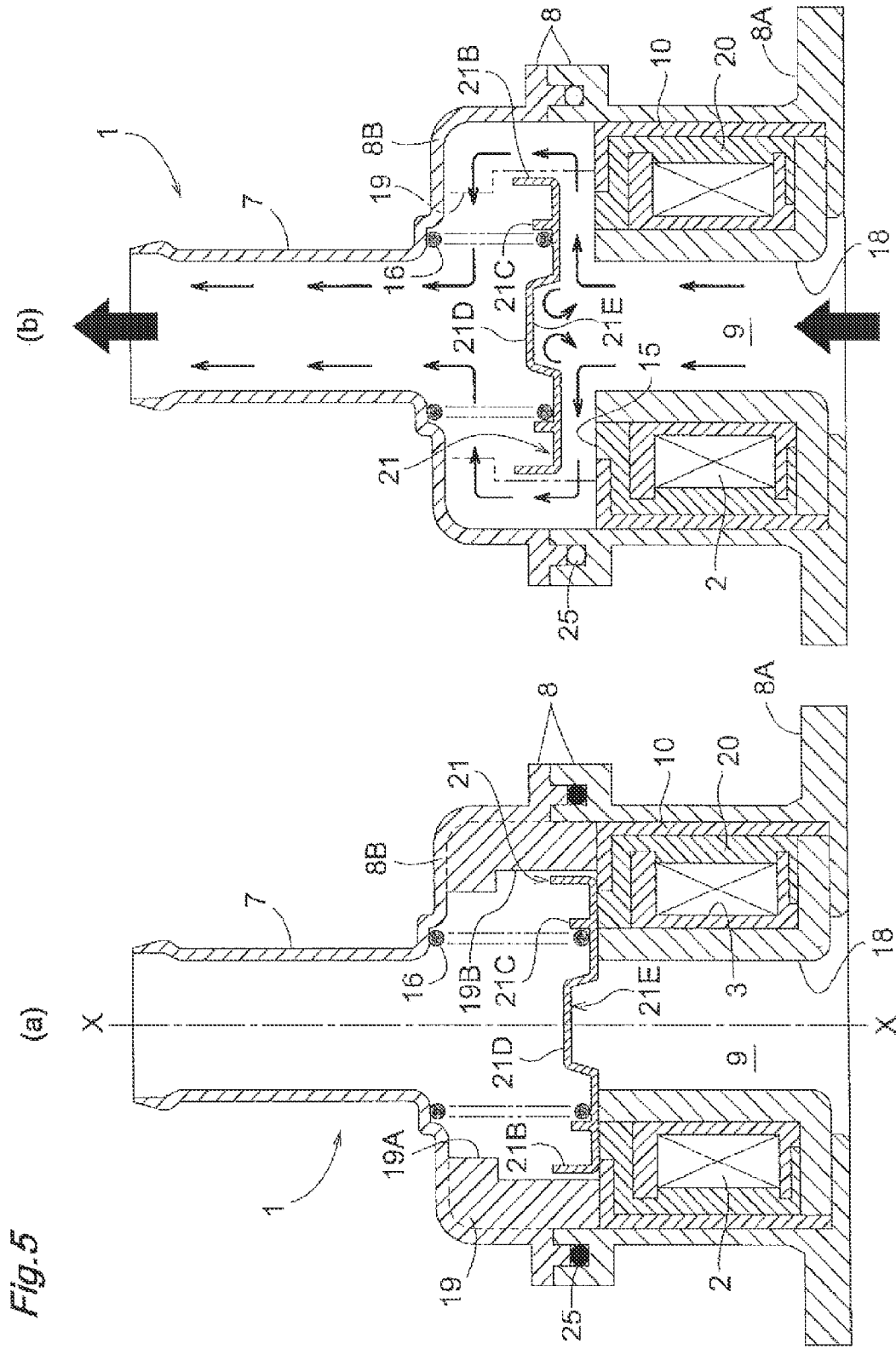
FIG. 5 is a sectional view showing the closing operation and opening operation of the coolant stop valve according to a third embodiment.

In a third embodiment of the vehicle coolant control valve 1, shown in FIG. 5, a truncated-conical convex part 21D which protrudes toward the output port 7 is formed by pressing or another method at the center of the valve body 21 in the radial direction thereof. The back surface of convex part 21D constitutes a concave part 21E having a bottom part further downstream in the flow direction of the fluid.

When the fluid pressure of coolant water is applied to the valve body 21 via the valve internal passage 9, and when the valve body 21 is opened by this fluid pressure from the closed state shown in FIG. 5A, the fluid pressure is focused in the space enclosed by the concave part 21E, and the fluid pressure thereby acts at a position closer to the valve opening direction than the center of gravity of the valve body 21 itself. Therefore, when the valve body 21 is opened by the fluid pressure of the fluid or when the valve body 21 is maintained in the open state, it is particularly easy to stabilize the valve body 21 in the expected orientation perpendicular to the axis X. In this embodiment, since the concave part 21E is positioned at the center in the radial direction of the valve body 21, the orientation of the valve body 21 is particularly easy to stabilize. In the example shown in FIG. 5B, it is estimated that, since a small annular vortex or stagnation of the coolant water is formed in the concave part 21E, a stable fluid pressure is focused at the concave part 21E.

(Fourth Embodiment)

Figure 6:
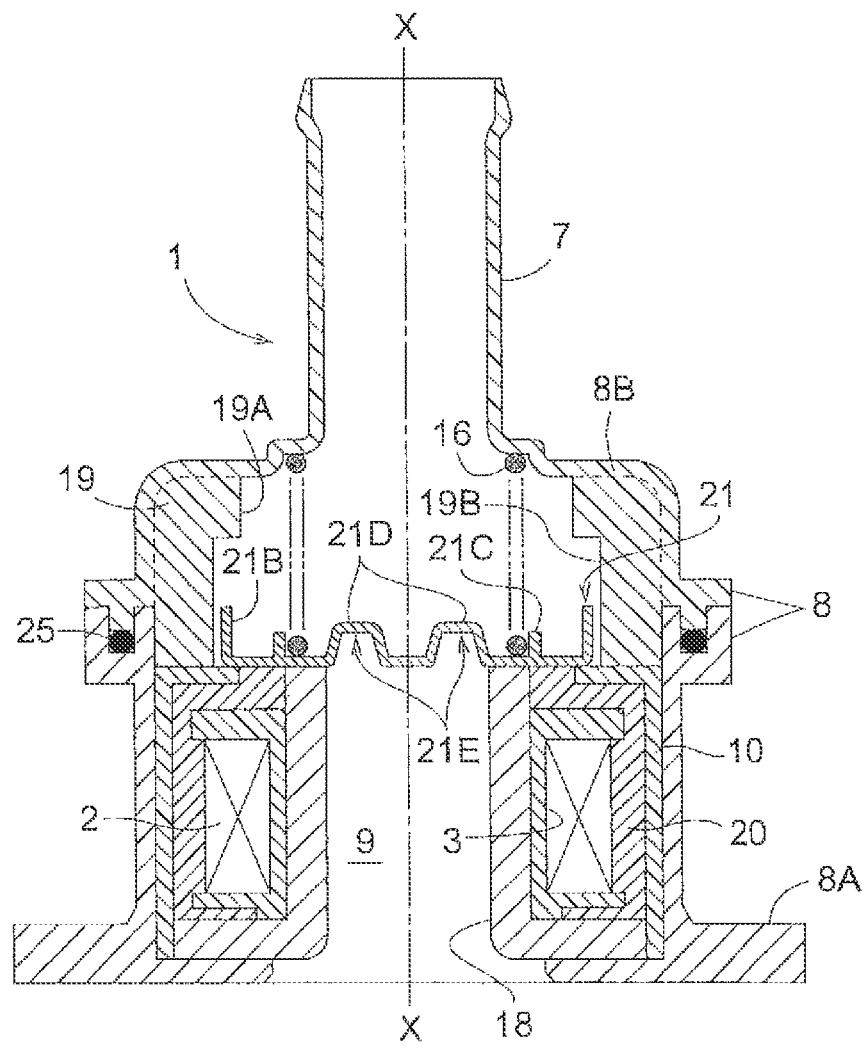
FIG. 6 is a sectional view showing the closing operation and opening operation of the coolant stop valve according to a fourth embodiment.

In a fourth embodiment of the vehicle coolant control valve 1, shown in FIG. 6, an annular convex part 21D which protrudes toward the output port 7 is formed by pressing or another method. The convex part 21D has an annular shape centered at the axis X, and the back surface of convex part 21D constitutes an annular concave part 21E having a bottom part further downstream in the flow direction of the fluid.

In this embodiment as well, when the fluid pressure of the coolant water is applied to the valve body 21 via the valve internal passage 9, and when the valve body 21 is opened by this fluid pressure, the fluid pressure is focused in the annular space enclosed by the concave part 21E, and the fluid pressure thereby acts at a position closer to the valve opening direction than the center of gravity of the valve body 21 itself. Therefore, when the valve body 21 is opened by the fluid pressure or when the valve is maintained in the open state, the valve body 21 is readily stabilized in the expected orientation perpendicular to the axis X.

(Fifth Embodiment)

Figure 7:
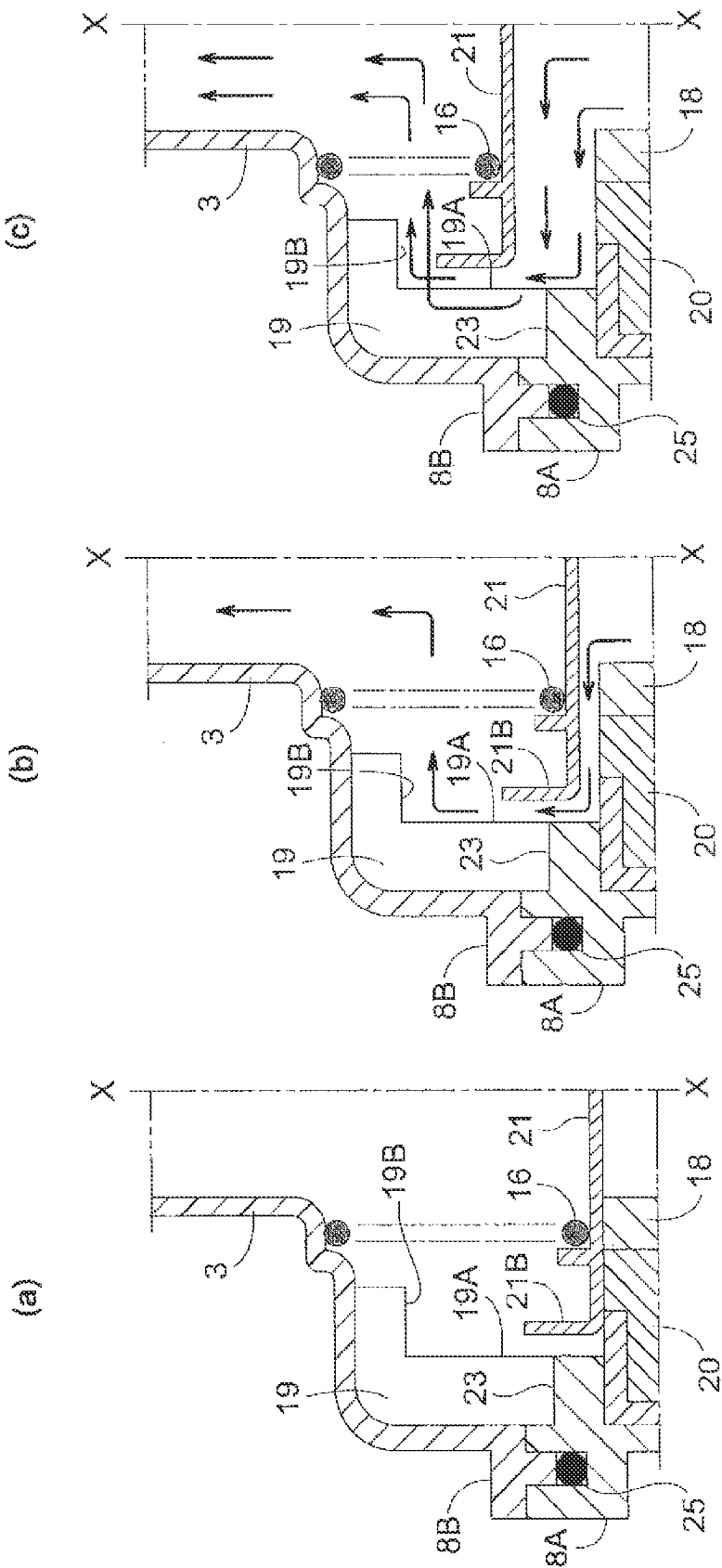
FIG. 7 is a sectional view showing the closing operation and opening operation of the coolant stop valve according to a fifth embodiment.
Figure 8:
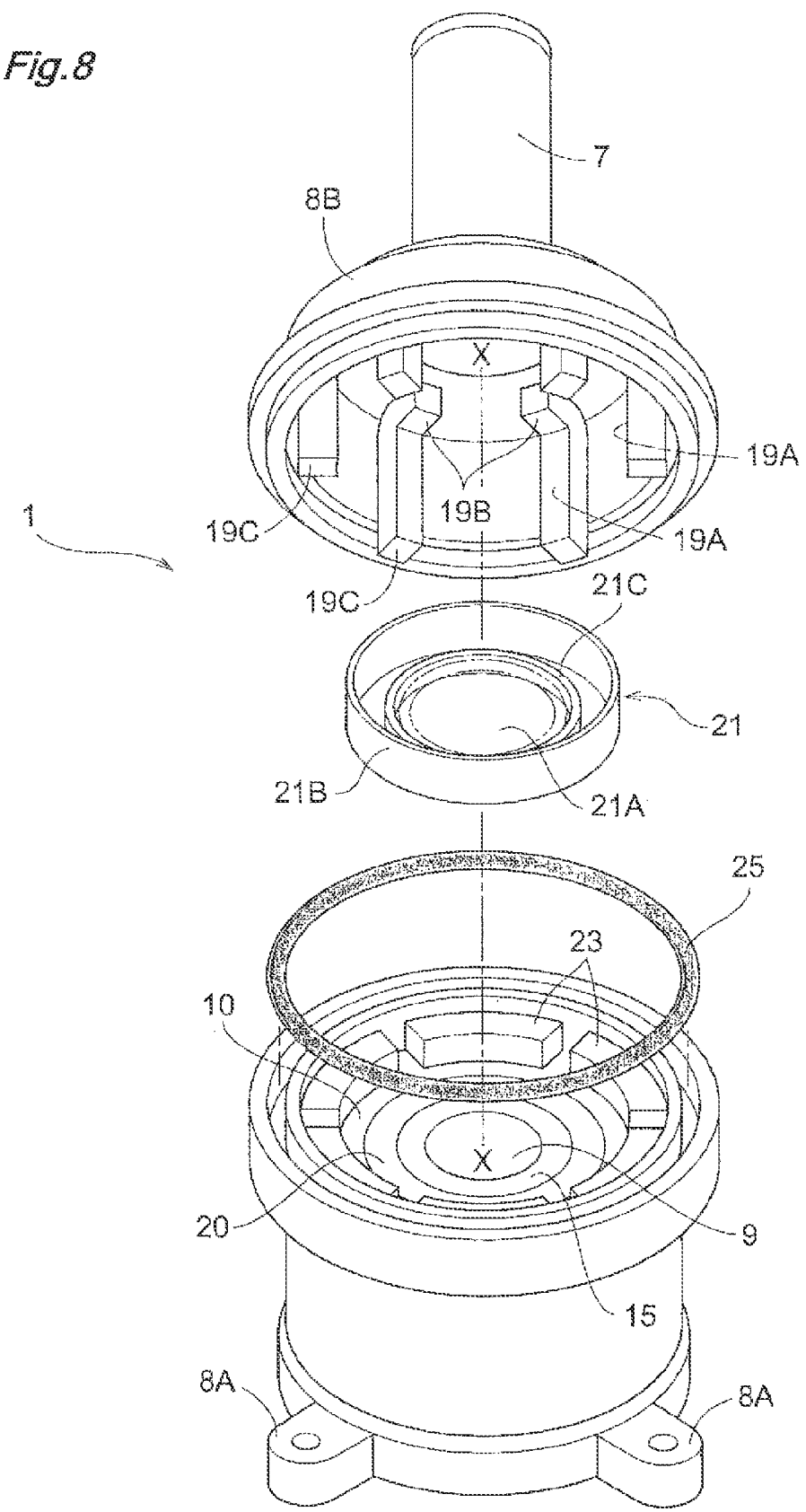
FIG. 8 is a partial exploded perspective view showing the coolant stop valve according to the fifth embodiment.

In a fifth embodiment of the vehicle coolant control valve 1, shown in FIGS. 7 and 8, an annular flow-suppressing block 23 (an example of the flow control part) is provided on the outermost periphery of the valve seat 15. As shown in FIG. 7, the flow-suppressing block 23 is integrally formed from the vicinity of the top end of the internal peripheral surface of the first housing 8A toward the inside in the radial direction. As shown in FIG. 7A, the internal peripheral surface of the flow-suppressing block 23 faces the outer edge part 21B (an example of the side surface) of the valve body 21 in the closed state thereof, in the radial direction.

In this embodiment, as shown in FIG. 7B, in a state in which a pressure of a certain value or less is applied to the valve body 21 from the coolant water by the action of the water pump 60, a small amount of coolant water enters the thin annular space between the valve body 21 and the valve seat 15 and flow-restricting block 23, the valve body 21 is separated slightly from the valve seat 15 by the pressure of the fluid entering the space, and the valve body 21 is maintained at a position at which at least a portion of the lateral surface of the valve body 21 still faces the flow-restricting block 23 in the radial direction. In this state, only a small amount of coolant water flows to the output port 7, and an essentially closed state is obtained in which the valve body 21 does not come in contact with the valve seat 15. Consequently, noise due to contact between the valve body 21 and the valve seat 15, or abrasion of these members is suppressed.

When the pressure applied to the valve body 21 by the coolant water exceeds a certain value from the state shown in FIG. 7B, and the valve body 21 adequately separates from the valve seat 15 against the urging force of the coil spring 16 until the lateral surface of the valve body 21 is no longer facing the flow-restricting block 23 in the radial direction, it is possible for the coolant water fed from the valve internal passage 9 to flow to the output port 7 via a wide space closer to the output port 7 than the flow-restricting block 23, and an essentially open state is obtained.

As shown in FIG. 8, the flow-restricting block 23 is provided in the vicinity of the top end of the internal peripheral surface of the first housing 8A in the form of a plurality (six in the drawing) of small blocks which is divided from each other at equal intervals in the peripheral direction, and when the second housing 8B is joined to the first housing 8A, the bottom ends of the valve body guide parts 19 integrally formed on the internal peripheral surface of the second housing 8B may be inserted in the gaps between the small blocks. FIG. 8 is an exploded perspective view in which the coil spring 16 is omitted.

(Sixth Embodiment)

Figure 9:
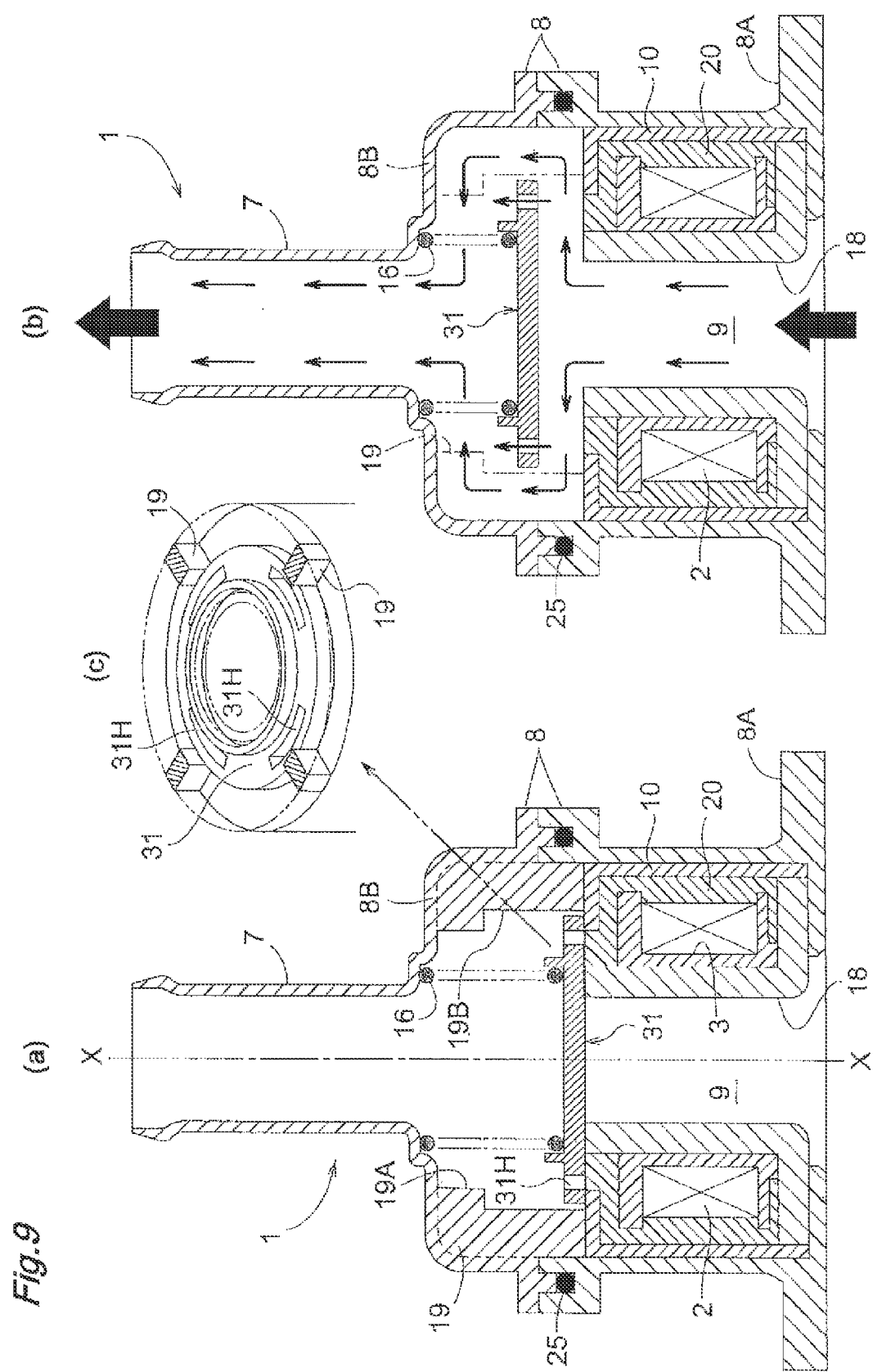
FIG. 9 is a sectional view showing a modified embodiment of the coolant stop valve according to the present invention.

In a sixth embodiment of the vehicle coolant control valve 1, shown in FIG. 9, through-holes 31H through which the coolant can flow are formed in portions of a valve body 31. In the example shown, as shown in FIG. 9C, four fan-shaped through-holes 31H are arranged at equal intervals in the peripheral direction slightly toward the inside in the radial direction from the external peripheral surface of the valve body 31. Since the through-holes 31H are disposed closer to the outside in the radial direction than the internal peripheral surface of the valve internal passage 9, in a state in which the valve body 31 is in contact with the valve seat 15, as shown in FIG. 9A, the valve seat 15 is adequately closed, the same as in the other embodiments. In the open state in which the valve body 31 is pushed up from the valve seat 15 by the fluid pressure from the valve internal passage 9, as shown in FIG. 9B, the coolant water flows not only through the external periphery of the valve body 31, but also from the through-holes 31H inside the valve body 31, and is discharged from the output port 7. As a result, the outside diameter of the valve body 31 may be somewhat small, and the overall size of the device can be reduced. Since the through-holes 31H are formed in the valve body 31 in the sixth embodiment, the valve body 31 must have a larger thickness than the valve bodies 11, 21 described above in order to receive an attractive force of a predetermined size from the solenoid.

(Other Embodiments)

(1) It is possible to embody by the configuration in which a portion of the first embodiment is modified so that a plurality of fluid outlets is formed annularly around the center shaft 11S and the bearing part 12 from the outside in the radial direction on the cover 13, and the plurality of fluid outlets is communicated with the output port 7 which extends along the axis X. In this embodiment, although the valve body 11 is supported by the center shaft 11S and the bearing part 12, the output port 7 and the valve internal passage 9 of the passage formation member 18 which is fitted into the inside of the solenoid 2 both share the axis X, and the orientation of the valve is more easily maintained than in a configuration in which a fluid outlet is provided beside the valve body 11.

(2) A configuration may be adopted in which the valve body guide parts are not provided to the inside surface of the housing, but a plurality of guide arms extends radially from the external periphery of the valve body. In this configuration, the distal ends of the plurality of guide arms can freely slide parallel to the axis X with respect to the smooth inside surface of the housing, and the valve body is thereby guided in a movement direction along the axis X.

INDUSTRIAL APPLICABILITY

The present invention can be used as the configuration of a vehicle coolant control valve provided with a valve body for controlling the flow of a fluid, the valve body having a magnetic body; a valve seat capable of coming in contact with the valve body; and a solenoid for moving the valve body toward the valve seat (bringing the valve body into contact with the valve seat; maintaining the valve body in the valve seat).

REFERENCE NUMERALS LIST 1 coolant stop valve (vehicle coolant control valve)
2 solenoid
3 core
7 output port (fluid outlet)
8 housing
8A first housing
8B second housing
11 valve body
11S center shaft
12 bearing part (support part)
15 valve seat
16 coil spring (urging means)
18 passage formation member (core)
19 valve body guide parts
21 valve body
21E concave part
23 flow-restricting block (flow control part)
31 valve body
60 water pump (pump)

The invention claimed is:

1. A vehicle coolant control valve comprising:
a valve body for controlling the flow of a fluid, the valve body being made of a magnetic material;
a valve seat capable of coming in contact with the magnetic material of said valve body, the valve seat being made of a magnetic material;
urging means for urging said valve body toward said valve seat;
a solenoid for moving said valve body toward said valve seat;
a yoke fixedly fitted onto the solenoid, the valve seat being provided in the yoke; and
a housing for surrounding at least said valve body and said urging means; wherein
said valve body is moved in the opening direction by fluid pressure of a fluid discharged from a pump during operation of said pump, against the urging force of said urging means in the closing direction;
said valve body is maintained in contact with said valve seat by the urging force acting in the closing direction when said pump is stopped;
said valve body is brought into contact with said valve seat by an attractive force acting in the closing direction, and the urging force acting in the closing direction when said pump is operated and said solenoid is excited, and retained in a closed state by a magnetic circuit formed by the valve body and the valve seat;
said valve body is pushed and retained in an open state by a fluid pressure acting in the opening direction when said pump is operated and said solenoid is not excited;
a passage formation member to be brought into contact with the fluid is provided on an internal periphery side of the solenoid, the solenoid and the passage formation member constituting a single assembly whereby the passage formation member does not move relative to the solenoid;

the housing is provided with a valve body guide part which extends from an internal peripheral surface of the housing toward the valve body and in a moving range of the valve body in the opening and closing direction; and the valve body guide part is configured to guide an outermost external periphery of the valve body to move the valve body in the opening and closing direction.

2. The vehicle coolant control valve according to claim 1, wherein said valve seat is provided to a core for housing said solenoid.

3. The vehicle coolant control valve according to claim 1, wherein a fluid outlet is formed on an axis along the opening and closing direction of said valve body.

4. The vehicle coolant control valve according to claim 1, wherein the valve body guide part has a first guide part which extends parallel to the opening and closing direction of the valve body, and a second guide part which extends inward in a radial direction from a top end of the first guide part.

5. The vehicle coolant control valve according to claim 1, wherein the valve body guide part is integrally formed with the housing.

6. The vehicle coolant control valve according to claim 1, wherein said fluid flows through the outside of said valve body when said valve body is open.

7. The vehicle coolant control valve according to claim 6, wherein a flow control wall is provided so as to face a lateral surface of said valve body until said valve body separates a predetermined amount from said valve seat.

8. The vehicle coolant control valve according to claim 1, wherein said valve body comprises a concave part having a bottom part further downstream in the flow direction of said fluid than the center of gravity of said valve body.

9. The vehicle coolant control valve according to claim 8, wherein said concave part is provided at the center in the radial direction of said valve body.

10. The vehicle coolant control valve according to claim 1, wherein when said valve body is open, said fluid flows between said valve body and said housing.

11. The vehicle coolant control valve according to claim 6, wherein the valve body guide part is provided between the outermost external periphery of said valve body and the internal peripheral surface of said housing.

12. The vehicle coolant control valve according to claim 11, wherein
   said valve body is disc-shaped; and
   a plurality of said valve body guide parts is provided at equal intervals in the peripheral direction of said valve body.

13. A vehicle coolant control valve comprising:
   a valve body for controlling the flow of a fluid, the valve body being made of a magnetic material;
   a valve seat capable of coming in contact with the magnetic material of said valve body, the valve seat being made of a magnetic material;
   a coil spring for urging said valve body toward said valve seat;
   a solenoid for moving said valve body toward said valve seat by supplying electric power and for stopping the movement of said valve body toward said valve seat by cutting the electric power;
   a yoke fixedly fitted onto the solenoid, the valve seat being provided in the yoke; and
   a housing having an input port and an output port through which the fluid passes and holding inside thereof the valve body, the valve seat, the coil spring and the solenoid; wherein
   said valve body is moved in the opening direction by fluid pressure of a fluid discharged from a pump during operation of said pump, against an urging force of said coil spring in the closing direction;
   said valve body is brought into contact with said valve seat by an attractive force acting in the closing direction, and the urging force acting in the closing direction when said pump is operated and said solenoid is excited, and retained in a closed state by a magnetic circuit formed by the valve body and the valve seat;
   all of axes of the input port, the output port, the coil spring, and the valve body are arranged in parallel;
   radial lengths of the input port or the output port, the coil spring, and the valve body increase in this order;
   the housing is provided with a valve body guide part which extends from an internal peripheral surface of the housing toward the valve body and in a moving range of the valve body in the opening and closing direction; and
   the valve body guide part is configured to guide an outermost external periphery of the valve body to move the valve body in the opening and closing direction.

14. The vehicle coolant control valve according to claim 13, wherein the valve body guide part has a first guide part which extends parallel to the opening and closing direction of the valve body, and a second guide part which extends inward in a radial direction from a top end of the first guide part.

15. The vehicle coolant control valve according to claim 13, wherein the valve body guide part is integrally formed with the housing.

* * * * *